United States Patent
Hingorani et al.

(10) Patent No.: US 9,431,817 B2
(45) Date of Patent: Aug. 30, 2016

(54) BATTERY ISOLATION CIRCUIT

(71) Applicant: MICROSOFT TECHNOLOGY LICENSING, LLC, Redmond, WA (US)

(72) Inventors: Vinod L. Hingorani, Redmond, WA (US); Hamid Shayesteh-pour, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 126 days.

(21) Appl. No.: 14/292,500

(22) Filed: May 30, 2014

(65) Prior Publication Data

US 2015/0349509 A1 Dec. 3, 2015

(51) Int. Cl.
  *H02H 9/00* (2006.01)
  *H02H 1/06* (2006.01)
  *H02H 9/04* (2006.01)
  *H02J 7/00* (2006.01)

(52) U.S. Cl.
  CPC ............... *H02H 1/06* (2013.01); *H02H 9/04* (2013.01); *H02J 7/0031* (2013.01)

(58) Field of Classification Search
  USPC ......................................................... 361/54
  See application file for complete search history.

(56) References Cited

U.S. PATENT DOCUMENTS

| | | | |
|---|---|---|---|
| 4,622,508 A | 11/1986 | Matteau | |
| 4,703,388 A * | 10/1987 | Ruhnau | B60T 8/885 307/10.1 |
| 4,905,115 A * | 2/1990 | Whidden | H02H 3/243 307/10.7 |
| 5,684,663 A | 11/1997 | Mitter | |
| 6,519,127 B1 | 2/2003 | Check | |
| 7,586,292 B1 | 9/2009 | Wakefield | |
| 8,373,392 B2 | 2/2013 | Dai | |
| 9,007,023 B2 * | 4/2015 | Dao | H02J 7/0022 320/111 |
| 2002/0027758 A1 * | 3/2002 | Oglesbee | G05F 1/565 361/104 |
| 2004/0169494 A1 | 9/2004 | Kim et al. | |
| 2011/0098583 A1 | 4/2011 | Pandia et al. | |
| 2012/0169292 A1 | 7/2012 | Cantin et al. | |
| 2012/0224289 A1 | 9/2012 | Peterson et al. | |

(Continued)

FOREIGN PATENT DOCUMENTS

WO 90/01435 2/1990

OTHER PUBLICATIONS

ISA European Patent Office, International Search Report and Written Opinion Issued in Patent Application No. PCT/US2015/032502, Jul. 16, 2015, WIPO, 15 pages.

(Continued)

*Primary Examiner* — Ronald W Leja
(74) *Attorney, Agent, or Firm* — Brandon Roper; Judy Yee; Micky Minhas

(57) ABSTRACT

Various embodiments relating to a battery isolation circuit for disconnecting a battery from a load are disclosed. In one embodiment, a battery isolation circuit includes a power switch, a protection circuit module (PCM), and a drive diverter. The power switch may be operatively intermediate a battery and a load. The PCM may be operatively connected to the power switch. The PCM may be configured to selectively drive the power switch to electrically connect the battery to the load. The drive diverter may be configured to interrupt the PCM from driving the power switch in order to electrically disconnect the battery from the load in response to activation of a user-operable switch.

20 Claims, 5 Drawing Sheets

(56) References Cited

U.S. PATENT DOCUMENTS

| | | | |
|---|---|---|---|
| 2013/0265010 A1 | 10/2013 | Nomura et al. | |
| 2014/0253045 A1* | 9/2014 | Poznar | H02J 7/0063 320/136 |
| 2015/0043117 A1* | 2/2015 | Xiang | H02H 3/10 361/91.5 |
| 2015/0200537 A1* | 7/2015 | Kang | H02J 7/0031 320/134 |
| 2015/0349509 A1* | 12/2015 | Hingorani | H02H 1/06 361/56 |

OTHER PUBLICATIONS

Fingas, Jon, "TomTom's new GPS watches track your heart rate without a chest strap (update: US pricing)", http://www.engadget.com/2014/04/03/tomtom-cardio-gps-watches/, Apr. 3, 2014, 10 pages.

Goode, Lauren, "Samsung's New Gear Fit Needs to Work on the "Fit" Part", http://recode.net/2014/04/08/samsungs-new-gear-fit-needs-to-work-on-the-fit-part/, Apr. 8, 2014, 10 pages.

"Samsung Gear Fit, Gear 2 and Gear 2 Neo go on sale worldwide", NDTV Gadgets, http://gadgets.ndtv.com/others/news/samsung-gear-fit-gear-2-and-gear-2-neo-go-on-sale-worldwide-507220, Apr. 11, 2014, 3 pages.

Poeter, Damon, "Meet Simband, Samsung's Next-Gen Health Tracker", http://www.pcmag.com/article2/0,2817,2458663,00.asp, May 28, 2014, 5 pages.

IPEA European Patent Office, Second Written Opinion issued in Application No. PCT/US2015/032502, Apr. 20, 2016, WIPO, 16 pages.

\* cited by examiner

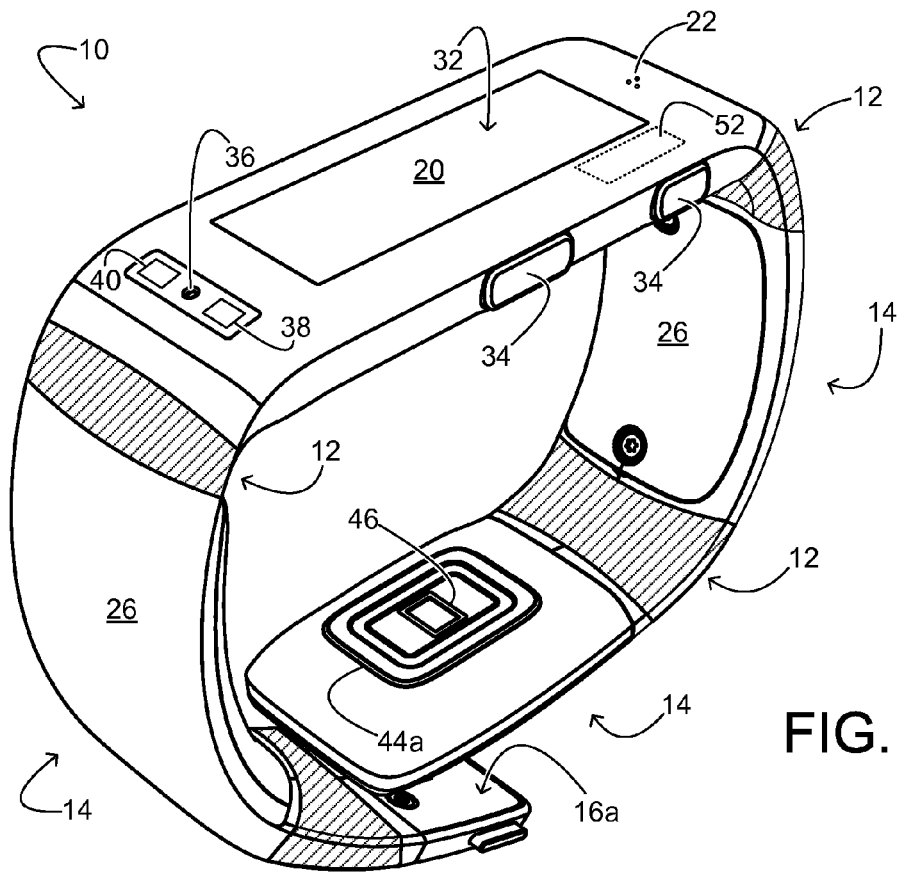
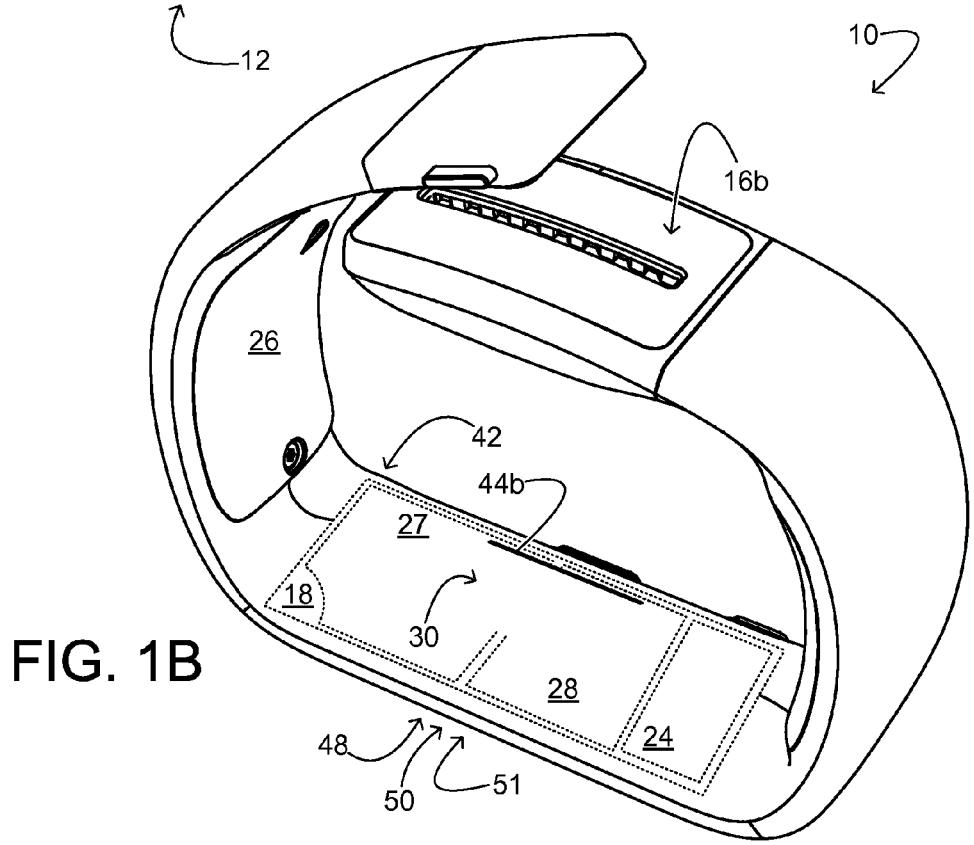
FIG. 1A
FIG. 1B

BATTERY ISOLATION CIRCUIT

BRIEF DESCRIPTION OF THE DRAWINGS

FIGS. 1A and 1B show an example wearable electronic device included a battery isolation circuit.

DETAILED DESCRIPTION

Figure 2:
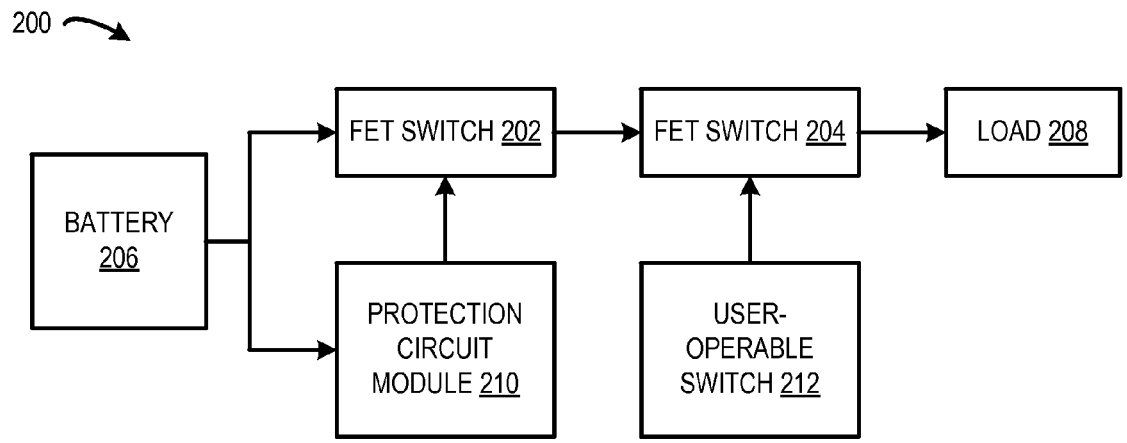
FIG. 2 shows a block diagram of an example dual-switch battery isolation circuit.

A battery isolation circuit may be implemented in an electronic device to protect a battery from becoming degraded due to adverse operating conditions of the electronic device (e.g., a runaway mode). In particular, the battery isolation circuit may be configured to disconnect the battery from a circuit load of the electronic device in response to activation of a user-operable switch. For example, a user may activate a switch on the electronic device when the electronic device becomes non-responsive or "freezes" in a particular state. By disconnecting the battery from the circuit load in response to activation of the user-operable switch, the battery may be protected from overcharge, overdischarge, overcurrent, and other adverse conditions that may cause battery degradation. Further, the user experience for the device may be improved because the user has a mechanism for resetting the device when it becomes unresponsive to other input.

This description relates to a battery isolation circuit having a simplified circuit topology that may result in a lower load impedance relative to other battery isolation circuit configurations. Implementations of battery isolation circuits described herein may be employed in any electronic device that includes a battery and a user-operable control switch (e.g., button). For example, a battery isolation circuit may be implemented in different types of sensory-and-logic systems, such as wearable electronic devices.

In one implementation, a battery isolation circuit includes a power switch, a protection circuit module (PCM), and a drive diverter. The power switch is operatively intermediate a battery and a load. The PCM is operatively connected to the power switch and is configured to selectively drive the power switch to electrically connect the battery to the load. The drive diverter is configured to interrupt the PCM from driving the power switch in order to electrically disconnect the battery from the load in response to activation of a user-operable switch.

FIGS. 1A and 1B show aspects of an example sensory-and-logic system that includes a battery isolation circuit. In particular, FIGS. 1A and 1B show a wearable electronic device 10. The illustrated device is band-shaped and may be worn around a wrist. Device 10 includes at least four flexion regions 12 linking less flexible regions 14. The flexion regions of device 10 may be elastomeric in some examples. Fastening componentry 16A and 16B is arranged at both ends of the device. The flexion regions and fastening componentry enable the device to be closed into a loop and to be worn on a user's wrist. In other implementations, wearable electronic devices of a more elongate band shape may be worn around the user's bicep, waist, chest, ankle, leg, head, or other body part. The device, for example, may take the form of eye glasses, a head band, an arm-band, an ankle band, a chest strap, or an implantable device to be implanted in tissue.

Wearable electronic device 10 includes various functional components integrated into regions 14. In particular, the electronic device includes a compute system 18, display 20, loudspeaker 22, communication suite 24, and various sensors. These components draw power from one or more energy-storage cells 26. A battery—e.g., a lithium ion battery—is one type of energy-storage cell suitable for this purpose. Examples of alternative energy-storage cells include super- and ultra-capacitors. In devices worn on the user's wrist, the energy-storage cells may be curved to fit the wrist, as shown in the drawings. As described in detail below, a battery isolation circuit is used to selectively interrupt power delivery from the energy-storage cells to other device components (e.g., display, sensors, etc.).

In general, energy-storage cells 26 may be replaceable and/or rechargeable. In some examples, recharge power may be provided through a universal serial bus (USB) port 30, which includes a magnetic latch to releasably secure a complementary USB connector. In other examples, the energy storage cells may be recharged by wireless inductive or ambient-light charging. In still other examples, the wearable electronic device may include electro-mechanical componentry to recharge the energy storage cells from the user's adventitious or purposeful body motion. For example, batteries or capacitors may be charged via an electromechanical generator integrated into device 10. The generator may be turned by a mechanical armature that turns while the user is moving and wearing device 10.

In wearable electronic device 10, compute system 18 is situated below display 20 and operatively coupled to the display, along with loudspeaker 22, communication suite 24, and the various sensors. The compute system includes a data-storage machine 27 to hold data and instructions, and a logic machine 28 to execute the instructions. Aspects of the compute system are described in further detail with reference to FIG. 5.

Display 20 may be any suitable type of display. In some configurations, a thin, low-power light emitting diode (LED) array or a liquid-crystal display (LCD) array may be used. An LCD array may be backlit in some implementations. In other implementations, a reflective LCD array (e.g., a liquid crystal on silicon, LCOS array) may be frontlit via ambient light. A curved display may also be used. Further, AMOLED displays or quantum dot displays may be used.

Communication suite 24 may include any appropriate wired or wireless communications componentry. In FIGS. 1A and 1B, the communications suite includes USB port 30, which may be used for exchanging data between wearable electronic device 10 and other computer systems, as well as providing recharge power. The communication suite may further include two-way Bluetooth, Wi-Fi, cellular, near-field communication and/or other radios. In some implementations, the communication suite may include an additional transceiver for optical, line-of-sight (e.g., infrared) communication.

In wearable electronic device 10, touch-screen sensor 32 is coupled to display 20 and configured to receive touch input from the user. The touch sensor may be resistive, capacitive, or optically based. Pushbutton sensors may be used to detect the state of push buttons 34, which may include rockers. Input from the pushbutton sensors may be used to enact a home-key or on-off feature, control audio volume, turn the microphone on or off, activate a battery isolation procedure, etc.

FIGS. 1A and 1B show various other sensors of wearable electronic device 10. Such sensors include microphone 36, visible-light sensor 38, ultraviolet sensor 40, and ambient temperature sensor 42. The microphone provides input to compute system 18 that may be used to measure the ambient sound level or receive voice commands from the wearer. Input from the visible-light sensor, ultraviolet sensor, and ambient temperature sensor may be used to assess aspects of the wearer's environment—i.e., the temperature, overall lighting level, and whether the wearer is indoors or outdoors.

FIGS. 1A and 1B show a pair of contact sensor modules 44A and 44B, which contact the wearer's skin when wearable electronic device 10 is worn. The contact sensor modules may include independent or cooperating sensor elements, to provide a plurality of sensory functions. For example, the contact sensor modules may provide an electrical resistance and/or capacitance sensory function, which measures the electrical resistance and/or capacitance of the wearer's skin. Compute system 18 may use such input to assess whether or not the device is being worn, for instance. In some implementations, the sensory function may be used to determine how tightly the wearable electronic device is being worn. In the illustrated configuration, the separation between the two contact-sensor modules provides a relatively long electrical path length, for more accurate measurement of skin resistance. In some examples, a contact sensor module may also provide measurement of the wearer's skin temperature. Arranged inside contact sensor module 44B in the illustrated configuration is an optical pulse rate sensor 46. The optical pulse-rate sensor may include an LED emitter and matched photodiode to detect blood flow through the capillaries in the skin and thereby provide a measurement of the wearer's pulse rate.

Wearable electronic device 10 may also include motion sensing componentry, such as an accelerometer 48, gyroscope 50, and magnetometer 51. The accelerometer and gyroscope may furnish inertial and/or rotation rate data along three orthogonal axes as well as rotational data about the three axes, for a combined six degrees of freedom. This sensory data can be used to provide a pedometer/calorie-counting function, for example. Data from the accelerometer and gyroscope may be combined with geomagnetic data from the magnetometer to further define the inertial and rotational data in terms of geographic orientation. The wearable electronic device may also include a global positioning system (GPS) receiver 52 for determining the wearer's geographic location and/or velocity. In some configurations, the antenna of the GPS receiver may be relatively flexible and extend into flexion regions 12.

Compute system 18, via the sensory functions described herein, is configured to acquire various forms of information about the wearer of wearable electronic device 10. Such information must be acquired and used with utmost respect for the wearer's privacy. Accordingly, the sensory functions may be enacted subject to opt-in participation of the wearer. In implementations where personal data is collected on the device and transmitted to a remote system for processing, that data may be anonymized. In other examples, personal data may be confined to the wearable electronic device, and only non-personal, summary data transmitted to the remote system.

A battery isolation circuit may be implemented in a wearable electronic device to disconnect a battery from a circuit load in order to protect the battery from adverse conditions that may arise during operation. FIG. 2 schematically shows a battery isolation circuit 200 having a dual-switch configuration. In particular, a first power switch 202 and a second power switch 204 may be connected in series between a battery 206 and a circuit load 208. In one example, the first and second power switches are metal-oxide field-effect transistor (MOSFET) switches that may be referred to herein as "FET" switches. In one example, the battery is a captive lithium-ion cell. The circuit load may be representative of any suitable electronic components that consume power from the battery.

A protection circuit module (PCM) 210 may be operatively connected to battery 206 and first FET switch 202. PCM 210 may be an integrated circuit (IC) configured to protect battery 206 from adverse conditions by controlling first FET switch 202. In one example, PCM 210 may be configured to monitor and protect against various adverse conditions including an overcharge condition, an overdischarge condition, a discharging overcurrent condition, a charging overcurrent condition, and a short condition. In one example, PCM 210 may be connected to a positive terminal and a negative terminal of the battery to monitor the voltage and the current of the battery in order to detect such adverse conditions by comparing the voltage, the current, and/or another parameter to different thresholds that indicate different adverse conditions.

Optionally, PCM 210 may be configured to communicate with other system components of the electronic device (e.g., an operating system or other control logic) that controls operation of the electronic device. In particular, PCM 210 may receive instructions from such control components to connect battery 206 to circuit load 208 or disconnect battery 206 from circuit load 208. In some implementations, such instructions may be indicative of an adverse condition. Further, in response to receiving such instructions, PCM 210 may activate or deactivate first FET switch 202.

During normal operating conditions of the electronic device (e.g., non-adverse conditions), PCM 210 may drive first FET switch 202 to allow power from battery 206 to flow through first FET switch 202. Further, during normal operating conditions, a user-operable switch 212 may drive second FET switch 204 to allow power from battery 206 to flow through first FET switch 202 and second FET switch 204 to circuit load 208. In other words, during normal operating conditions, the first and second FET switches may be driven to electrically connect the battery with the circuit load.

Furthermore, in response to detecting an adverse condition, PCM 210 may be configured to stop driving first FET switch 202, causing first FET switch 202 to open, and battery 206 to be electrically disconnected from circuit load 208. For example, PCM 210 may stop driving first FET switch 202 by not supplying a drive voltage to first FET switch 202 or by lowering a voltage below a drive threshold of first FET switch 202. Note that if first FET switch 202 is open, then battery 206 is electrically disconnected from circuit load 208 regardless of the state of second FET switch 204.

During operation of the electronic device, a user may activate user-operable switch 212 for any suitable reason. In one example, a user may recognize an adverse condition that is not necessarily detected by PCM 210. For example, a user may recognize that the electronic device has become frozen in a particular state, and the user may activate user-operable switch 212 as part of a reboot procedure to clear the frozen state. In response to activation of user-operable switch 212, user-operable switch 212 may stop driving second FET switch 204. For example, user-operable switch 212 may stop driving second FET switch 204 by not supplying a drive voltage to second FET switch 204 or by lowering a voltage below a drive threshold of second FET switch 204. Note that if second FET switch 204 is open, then battery 206 is electrically disconnected from circuit load 208 regardless of the state of first FET switch 202.

However, two FET switches connected in series between the battery and the circuit load may generate an increased impedance at the circuit load relative to a single power switch configuration. The increase in impedance may cause an increase in signal noise that reduces device performance. Further, FET switches may be large and costly relative to other components of the battery isolation circuit. Thus, by using a dual-FET switch configuration, cost and size of the battery isolation circuit may be increased relative to a single FET switch configuration.

Figure 3:
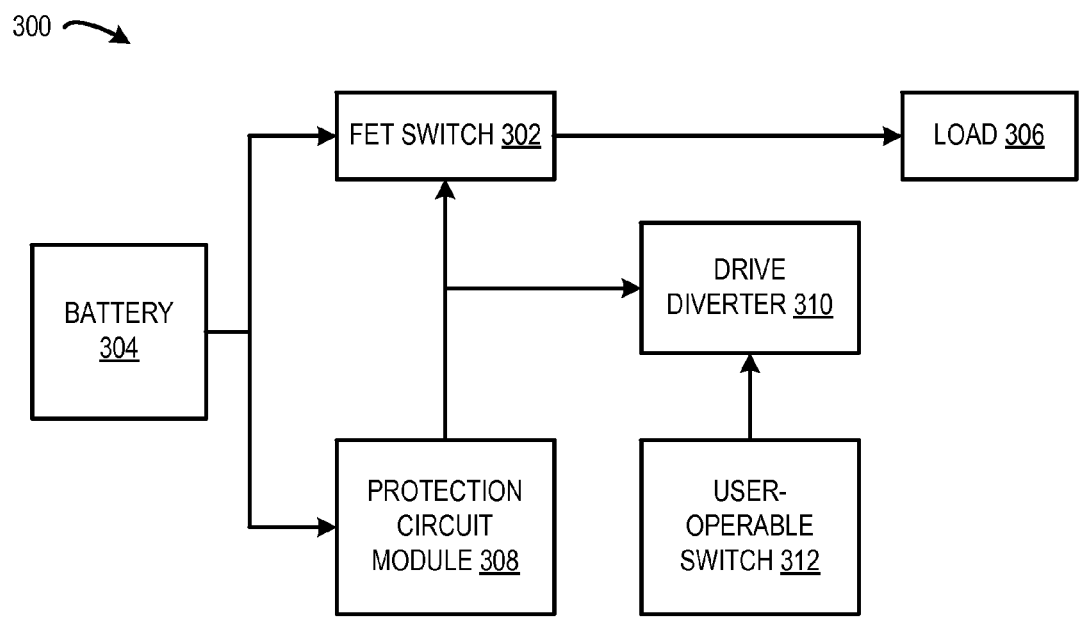
FIG. 3 shows a block diagram of an example single-switch battery isolation circuit.

FIG. 3 schematically shows an example battery isolation circuit 300 having a single-switch configuration. In particular, battery isolation circuit 300 may include a single power switch 302 connected between a battery 304 and a circuit load 306. Components of battery isolation circuit 300 that may be substantially the same as those of battery isolation circuit 200 are described no further. However, it will be noted that components identified in the same way in different implementations may be at least partly different.

A PCM 308 may be operatively connected to FET switch 302 and battery 304. PCM 308 may be configured to selectively drive FET switch 302 to electrically connect battery 304 to circuit load 306. Further, PCM may be configured to monitor operation of battery 304 in order to detect various adverse operating conditions. In response to detecting an adverse condition, PCM 308 may be configured to disconnect battery 304 from circuit load 306 by opening FET switch 302.

A drive diverter 310 may be operatively connected to PCM 308 and FET switch 302. Further, drive diverter 310 may be operatively connected to user-operable switch 312. Drive diverter 310 may be configured to interrupt PCM 308 from driving FET switch 302 in response to activation of a user-operable switch 312. For example, drive diverter 310 may sink current provided by PCM 308 that would otherwise charge the gate of FET switch 302. Thus, in that example, drive diverter 310 would prevent FET switch 302 from turning on. In this way, battery 304 may be electrically disconnected from circuit load 306 in response to activation of user-operable switch 312. As described in the example above, drive diverter 310 may interrupt PCM 308 by shunting current supplied by PCM 308 to ground in response to activation of user-operable switch 312. Because the drive current is shunted to ground instead of being provided to FET switch 302, the gate of FET switch 302 is not charged, and therefore FET switch 302 is opened to electrically disconnect battery 304 from circuit load 306. In some implementations, activation of drive diverter 310 may cause current and voltage that are monitored by PCM 308 to be indicative of a circuit fault that causes PCM 308 to stop driving FET switch 302.

By employing the drive diverter, battery isolation circuit 300 is able to electrically disconnect the battery from the circuit load in response to activation of the user-operable switch without adding a series impedance of a second power FET switch. In this way, the impedance at the circuit load may be reduced relative to a dual-FET switch battery isolation circuit configuration. Moreover, by employing a single power switch, a size and cost of battery isolation circuit 300 may be reduced relative to the dual-FET switch configuration of battery isolation circuit 200. In other words, the battery isolation circuit 300 may have a simplified circuit topology and reduced circuit load impedance relative to a dual-FET switch battery isolation circuit configuration. Moreover, the battery isolation circuit 300 may provide a less expensive and simpler control solution relative to using a microcontroller for battery isolation.

Figure 4:
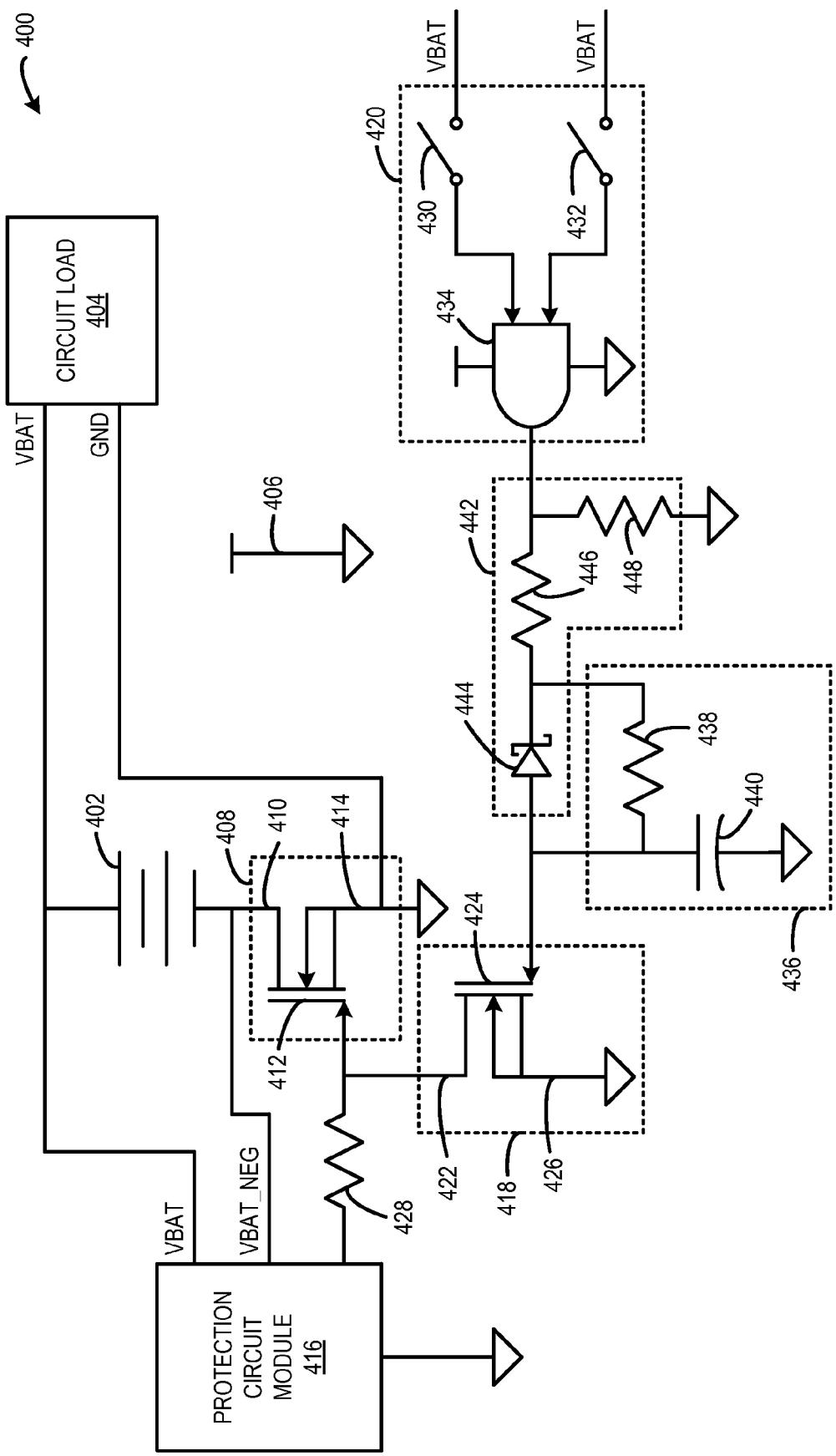
FIG. 4 shows a circuit diagram of an example battery isolation circuit.

FIG. 4 shows a circuit diagram of an example battery isolation circuit 400. The function of battery isolation circuit 400 may correspond to the function of battery isolation circuit 300. Battery isolation circuit 400 is shown in simplified form. It will be understood that various electric components may be omitted for the purpose of simplicity. For example, various de-bounce and electro-static discharge (ESD) protection components that may be included are omitted from FIG. 4.

A battery 402 may provide power to a circuit load 404. In particular, circuit load 404 may be connected to a positive terminal of battery 402 and a system ground 406. Circuit load 404 may be representative of electrical components of an electronic device (e.g., wearable electronic device 10 shown in FIGS. 1A and 1B) that consume power from battery 402. In one example, battery 402 is a captive lithium-ion cell.

A power switch 408 may be operatively connected to battery 402 and circuit load 404. In one example, power switch 408 is a power MOSFET switch including a drain 410, a gate, 412, and a source 414. Drain 410 may be connected to a negative terminal of battery 402. Source 414 may be connected to system ground 406. A PCM 416 may be configured to selectively drive power switch 408 to electrically connect battery 402 to circuit load 404. In particular, PCM 416 may supply a drive voltage to gate 412 to place power switch 408 in an on state. During normal operating conditions, PCM 416 may continuously drive power switch 408 to electrically connect battery 402 to circuit load 404.

Furthermore, PCM 416 may be connected to the positive terminal and the negative terminal of battery 402 as well as to system ground 406 to monitor a voltage and a current of battery 402. PCM 416 may be configured to disconnect battery 402 from circuit load 404 in response to detecting an adverse condition that may cause battery degradation. Such an adverse condition may be detected based on the voltage, the current and/or another observed parameter of battery 402. Optionally, PCM 416 may be configured to disconnect battery 402 from circuit load 404 responsive to receiving from other control components (e.g., an operating system) of the electronic device instructions indicative of an adverse condition.

A drive diverter 418 may be operatively intermediate PCM 416 and power switch 408. Drive diverter 418 may be configured to interrupt PCM 416 from driving power switch 408 in order to electrically disconnect battery 402 from circuit load 404 in response to activation of a user-operable switch 420.

In one example, drive diverter 418 is a MOSFET having a drain 422, a gate 424, and a source 426. Drain 422 may be operatively connected between PCM 416 and power switch 408. Gate 424 may be operatively connected to user-operable switch 420. Source 426 may be operatively connected to system ground 406. During normal operation, user-operable switch 420 is not activated and does not apply an activation voltage to gate 424 of drive diverter 418 and the MOSFET is placed in an off state. Accordingly, a drive voltage is supplied by PCM 416 to gate 412 to place power switch 408 in an on state that connects battery 402 to circuit load 404.

In response to activation of user-operable switch 420, an activation voltage is applied to gate 424 of drive diverter 418 that places the MOSFET in an on state. When the MOSFET is turned on, a low impedance path is created causing the drive current supplied by PCM 416 to be shunted via drive diverter 418 to ground 406, thus pulling the voltage on gate 412 to ground or within millivolts of ground. In particular, activation of drive diverter 418 causes a dilution of the drive voltage supplied to gate 412 of power switch 408 that lowers the drive voltage below an activation threshold of gate 412 that causes power switch 408 to be placed in an off state. Moreover, the drive voltage may be lowered below a low voltage threshold of PCM 416 that induces a low voltage fault at PCM 416. In response to the low voltage fault, PCM 416 stops providing the drive current and voltage to power switch 408. In this way, battery 402 may be disconnected from circuit load 404 in response to activation of user-operable switch 420.

In some implementations, a pull-down resistor 428 may be operatively intermediate PCM 416 and source 422 of drive diverter 418. Pull-down resistor 428 may be configured to pull down the drive voltage from PCM 416 to ground 406 when the activation voltage is applied to gate 424 of drive diverter 418. In other words, pull-down resistor 428 may ensure that drive diverter 418 can pull down any drive voltage provided by PCM 416 below the activation threshold of gate 412 in order to turn off power switch 408. In one particular example, pull-down resistor 428 has a resistance of two thousand two hundred ohms.

In some implementations, user-operable switch 420 may include a plurality of user-operable switches that are activated at the same time in order for the activation voltage to be applied to drive diverter 418. By requiring a plurality of user-operable switches to be activated at the same time, a likelihood of unintentionally disconnecting the battery from the circuit load may be reduced.

In the illustrated implementation, user-operable switch 420 may include a first switch 430 and a second switch 432 operatively connected to a combinational logic gate 434. The first and second switches may be any suitable type of switch that can be activated by a user. For example, the switches may include mechanical push buttons, capacitive buttons, toggle switches, or another suitable type of user-operable switch. First switch 430 may be connected to the positive terminal of battery 402, such that when first switch 430 is activated a high signal is provided to an input of combinational logic gate 434. Likewise, second switch 432 may be connected to the positive terminal of battery 402, such that when second switch 432 is activated a high signal is provided to an input of combinational logic gate 434.

Combinational logic gate 434 may be configured to activate the user-operable switch 420 in response to first switch 430 and second switch 432 being activated at the same time. In this example, the combinational logic gate is an AND gate that outputs a high output when both inputs are driven high via activation of both of the first and second switches. Any suitable type of combinational logic may be implemented in the user-operable switch to combine the output of the first and second switches. For example, the combinational logic may provide an active high output, an active low output, or another suitable indication of activation of the first and second switches.

Any suitable number of user-operable switches may be employed to allow a user to manually disconnect the battery from the circuit load.

In some implementations, a timer circuit 436 may be operatively intermediate user-operable switch 420 and drive diverter 418. Timer circuit 436 may be configured to delay activation of drive diverter 418 for a designated period of time that user-operable switch 420 is activated. In other words, the user has to activate the user-operable switch for the designated period in order to activate drive diverter 418 and disconnect battery 402.

Timer circuit 436 may include a resistor 438 connected in series with a capacitor 440. Timer circuit 436 may be configured to apply the activation voltage to drive diverter 418 in response to capacitor 440 being charged through resistor 438 for a designated period by activation of user-operable switch 420. As an example, a high output provided by combinational logic gate 434 may charge capacitor 440 while first switch 430 and second switch 432 are activated. In response to the capacitor 440 being fully charged, the activation voltage may be provided to gate 424 of drive diverter 418. In one example, the timer circuit may be configured to delay activation of drive diverter 418 for approximately ten seconds after user-operable switch has been activated. In one particular example, capacitor 440 has a capacitance of ten microfarads and resistor 438 has a resistance of four million seven hundred thousand ohms. In other implementations, a digital delay or de-bounce circuit may be used to delay the activation voltage from being applied to drive diverter 418.

In some implementations, battery isolation circuit 400 may be configured to be reset after battery 402 is disconnected from circuit load 404. In other words, once an adverse condition of the electronic device is cleared, the electronic device may be returned to normal operation including battery 402 being reconnected with circuit load 404. In one example, reset of the electronic device may be initiated in response to connecting a powered connection to the electronic device. In particular, the powered connection may provide power across battery 402 and to PCM 416 that may activate an internal mechanism that provides the drive voltage to activate power switch 408.

Due to the high impedance of the MOSFET of drive diverter 418, capacitor 440 may hold the charge of the activation voltage at gate 424 indefinitely, such that power switch 408 cannot be turned on to reconnect battery 402 with circuit load 404. Accordingly, in some implementations, a reset circuit 442 may be operatively intermediate user-operable switch 420 and gate 424 of drive diverter 418. Reset circuit 442 may include a diode 444 connected in parallel with resistor 438 of timer circuit 436. Diode 444 may be connected such that when user-operable switch 420 is driving a high output, diode 444 is reverse biased causing capacitor 440 to be charged. In particular, diode 444 may prevent the activation voltage from flowing directly to gate 424 and instead the activation voltage is directed across resistor 438 to charge capacitor 440.

On the other hand, when battery 402 is not connected to circuit load 404 and combinational logic gate 434 is not outputting the activation voltage, diode 444 may be forward biased causing capacitor 440 to be discharged. In particular, reset circuit 442 may include a first resistor 446 operatively intermediate diode 444 and user-operable switch 420 and a second resistor 448 connected between a node operatively intermediate first resistor 446 and user-operable switch 420 and ground 406. First resistor 446 and second resistor 448 form a voltage divider that may discharge capacitor 440 more quickly than resistor 438 of timer circuit 436. In one example, first resistor 446 has a resistance of one thousand ohms and second resistor 448 has a resistance of ten thousand ohms. Once capacitor 440 has been discharged, drive diverter 418 may be turned off and the drive voltage provided by PCM 416 may be allowed to activate power switch 408 to connect battery 402 to circuit load 404.

Figure 5:
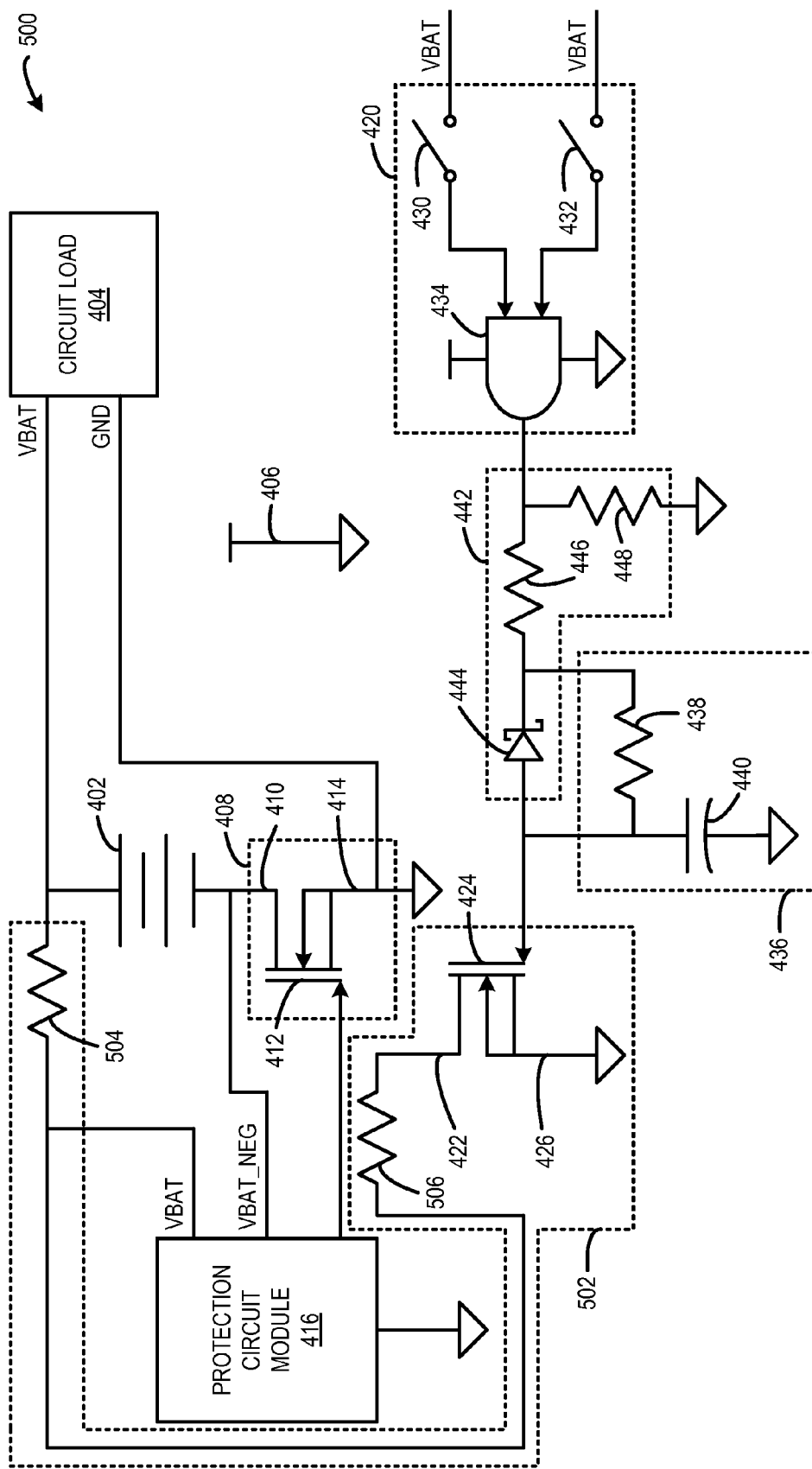
FIG. 5 shows a circuit diagram of another example battery isolation circuit.

FIG. 5 shows a circuit diagram of another example battery isolation circuit 500. The function of battery isolation circuit 500 may correspond to the function of battery isolation circuit 300 and 400. Battery isolation circuit 500 is shown in simplified form. It will be understood that various electric components may be omitted for the purpose of simplicity. For example, various de-bounce and electro-static discharge (ESD) protection components that may be included are omitted from FIG. 5.

Components of battery isolation circuit 500 that may be substantially the same as those of battery isolation circuit 400 are identified in the same way and are described no further. Battery isolation circuit 500 differs from battery isolation circuit 400 by incorporating a voltage divider, comprised of resistors 504 and 506, into drive diverter 502. The voltage divider may induce PCM 416 into a low voltage fault when user-operable switch 420 is activated. The low voltage fault causes PCM 416 to stop providing the drive voltage to power switch 408. In particular, drive diverter 502 includes a first resistor 504 connected between the positive terminal of battery 402 and a positive battery voltage pin of PCM 416. Further, drive diverter 502 includes a second resistor 506 connected at a junction of first resistor 504 and the positive battery voltage pin of PCM 416. Further, second resistor 506 is positioned between first resistor 504 and drain 422 of the MOSFET in the drive diverter. In this implementation, drain 422 of the MOSFET does not connect to gate 412 of power switch 408.

First resistor 504 and second resistor 506 form a voltage divider for the battery supply voltage when user-operable switch 420 is activated. In particular, in response to activation of user-operable switch 420, an activation voltage is applied to gate 424 of drive diverter 418 that places the MOSFET in an on state. When the MOSFET is turned on, a low impedance path is created causing the battery supply current to be shunted to ground 406 via drive diverter 418. In particular, activation of drive diverter 418 causes a reduction of the battery supply voltage supplied to the positive battery voltage pin of PCM 416. The lowered battery supply voltage appearing at the positive battery voltage pin of PCM 416 falls below a low voltage threshold (e.g., under voltage lockout threshold) of PCM 416. In response to the battery supply voltage dropping below the low voltage threshold, PCM 416 trips and disconnects the drive voltage from power switch 408. In this way, battery 402 may be disconnected from circuit load 404 in response to activation of user-operable switch 420.

First resistor 504 and second resistor 506 may be sized with any suitable resistances that induce the low voltage fault of PCM 416. In one example, first resistor 504 has a resistance of one thousand ohms. Such a resistance may be small enough to not interfere with the battery sensing capabilities of PCM 416. Note that the positive battery voltage (VBAT) pin of PCM 416 may consume three to six microamps, and thus can be used to power PCM 416 as well as act as a sense line for the battery supply voltage. Further, second resistor 506 may be designed with a resistance to provide a drop of the battery supply voltage suitable to trip PCM 416.

The battery isolation circuit 500 leverages the protections (e.g., low voltage threshold) built into PCM 416 to isolate the battery 402 in response to activation of user-operable switch 420. The voltage divider of drive diverter 418 may be designed on a per-PCM basis because different PCMs may have different known operating thresholds that induce the PCM into disconnecting the drive voltage. On the other hand, the battery isolation circuit 400 may operate based on unknown behavior of the PCM by diverting the drive voltage generated by the PCM instead of directly inducing a known fault of the PCM.

The above described battery isolation circuits may allow a battery to be disconnected from a circuit load in response to activation of a user-operable switch in a manner that has a reduced impedance at the circuit load relative to a dual-switch configuration. Moreover, the battery isolation circuits may have a simpler and smaller circuit topology relative to the dual-switch configuration. Further still, the battery isolation circuits may be less expensive to implement than the dual-switch configuration or a microcontroller used for battery isolation.

As evident from the foregoing description, the battery isolation circuit described herein may be tied to a sensory-and-logic system of one or more machines. FIGS. 1A and 1B show one, non-limiting example of a sensory-and-logic system that may include the battery isolation circuit described herein. However, such a battery isolation circuit may be included in battery-operated electronic devices of other configurations and form factors, as shown schematically in FIG. 6.

Figure 6:
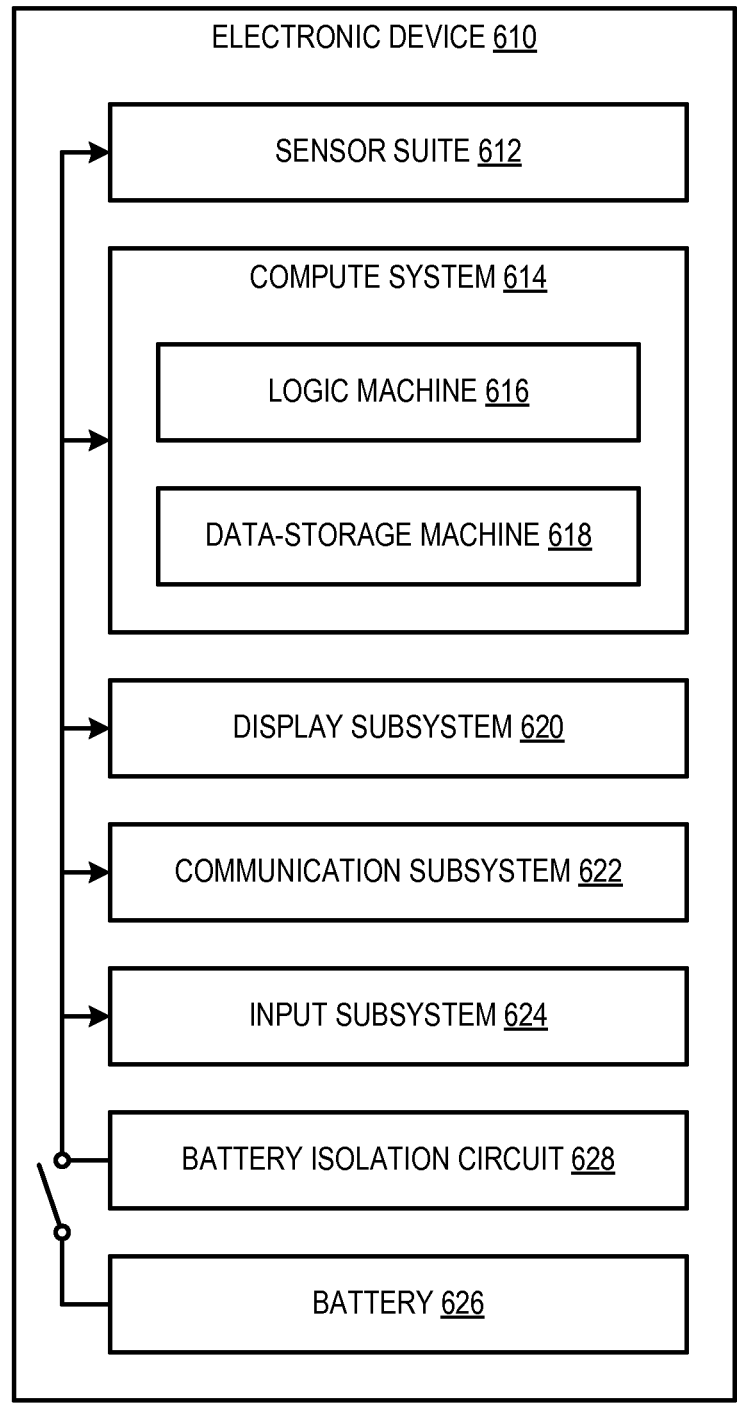
FIG. 6 shows an example sensory-and-logic system including a battery isolation circuit.

FIG. 6 schematically shows a form-agnostic battery-operated electronic device 610 that includes a sensor suite 612 operatively coupled to a compute system 614. The compute system includes a logic machine 616 and a data-storage machine 618. The compute system is operatively coupled to a display subsystem 620, a communication subsystem 622, an input subsystem 624, and/or other components not shown in FIG. 6. A battery 626 provides power to compute system 614, sensor suite 612, display subsystem 620, communication subsystem 622, and input subsystem 624. A battery protection circuit 628 selectively interrupts power delivery from the battery 626 to the various electrical loads. In one example, an electrical load may be the total electrical power consumed by sensor suite 612, compute system 614, display subsystem 620, communication subsystem 622, and input subsystem 624.

Logic machine 616 includes one or more physical devices configured to execute instructions. The logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 616 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices in a cloud-computing configuration.

Data-storage machine 618 includes one or more physical devices configured to hold instructions executable by logic machine 616 to implement the methods and processes described herein. When such methods and processes are implemented, the state of the data-storage machine may be transformed—e.g., to hold different data. The data-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The data-storage machine may include volatile, nonvolatile, dynamic, static, read/write, read-only, random-access, sequential-access, location-addressable, file-addressable, and/or content-addressable devices.

It will be appreciated that data-storage machine 618 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 616 and data-storage machine 618 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 620 may be used to present a visual representation of data held by data-storage machine 618. This visual representation may take the form of a graphical user interface (GUI). As the herein described methods and processes change the data held by the storage machine, and thus transform the state of the storage machine, the state of display subsystem 620 may likewise be transformed to visually represent changes in the underlying data. Display subsystem 620 may include one or more display subsystem devices utilizing virtually any type of technology. Such display subsystem devices may be combined with logic machine 616 and/or data-storage machine 618 in a shared enclosure, or such display subsystem devices may be peripheral display subsystem devices. Display 20 of FIGS. 1A and 1B is an example of display subsystem 620.

Communication subsystem 622 may be configured to communicatively couple compute system 614 to one or more other computing devices. The communication subsystem may include wired and/or wireless communication devices compatible with one or more different communication protocols. As non-limiting examples, the communication subsystem may be configured for communication via a wireless telephone network, a local- or wide-area network, and/or the Internet. Communication suite 24 of FIGS. 1A and 1B is an example of communication subsystem 622.

Input subsystem 624 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Touch screen sensor 32 and push buttons 34 of FIGS. 1A and 1B are examples of input subsystem 624.

Sensor suite 612 may include one or more different sensors—e.g., a touch-screen sensor, push-button sensor, microphone, visible-light sensor, ultraviolet sensor, ambient-temperature sensor, contact sensors, optical pulse-rate sensor, accelerometer, gyroscope, magnetometer, and/or GPS receiver—as described above with reference to FIGS. 1A and 1B.

It will be understood that the configurations and approaches described herein are exemplary in nature, and that these specific implementations or examples are not to be taken in a limiting sense, because numerous variations are feasible. The specific routines or methods described herein may represent one or more processing strategies. As such, various acts shown or described may be performed in the sequence shown or described, in other sequences, in parallel, or omitted.

The subject matter of this disclosure includes all novel and non-obvious combinations and sub-combinations of the various processes, systems and configurations, and other features, functions, acts, and/or properties disclosed herein, as well as any and all equivalents thereof.

The invention claimed is:

1. A battery isolation circuit comprising:
   a power switch operatively intermediate a battery and a load;
   a protection circuit module (PCM) operatively connected to the power switch, the PCM being configured to selectively drive the power switch to electrically connect the battery to the load, the PCM being configured to monitor a plurality of different parameters of the battery and to stop driving the power switch based on a comparison of at least one of the plurality of different parameters to a corresponding threshold; and
   a drive diverter configured to interrupt the PCM from driving the power switch in order to electrically disconnect the battery from the load in response to activation of a user-operable switch, the drive diverter being configured to interrupt the PCM by causing one of the plurality of different parameters to violate a corresponding threshold.

2. The battery isolation circuit of claim 1, wherein the PCM selectively drives the power switch by supplying a drive current to the power switch, and the drive diverter is configured to interrupt the PCM by shunting the drive current provided by the PCM to a ground in response to activation of the user-operable switch.

3. The battery isolation circuit of claim 2, wherein the drive diverter includes a field-effect transistor (FET) having a drain operatively connected between the PCM and the power switch, a gate operatively connected to the user-operable switch, and a source operatively connected to the ground, and wherein activation of the user-operable switch charges the gate of the FET causing the drive current to be shunted via the FET to the ground.

4. The battery isolation circuit of claim 3, further comprising:
   a pull-down resistor operatively intermediate the PCM and the source of the FET, the pull-down resistor being configured to pull down a drive voltage from the PCM to the ground when the gate of the FET is charged.

5. The battery isolation circuit of claim 1, wherein the PCM selectively drives the power switch by supplying a drive voltage to the power switch, wherein the PCM receives a battery supply voltage from a positive terminal of the battery, wherein the drive diverter is configured to interrupt the PCM by lowering the battery supply voltage below a low voltage threshold of the PCM in response to activation of the user-operable switch, and wherein the PCM is configured to stop supplying the drive voltage in response to the battery supply voltage being less than the low voltage threshold.

6. The battery isolation circuit of claim 5, wherein the drive diverter includes a first resistor operatively intermediate the PCM and the positive terminal of the battery and a second resistor connected in series with the first resistor, wherein the first resistor and the second resistor form a voltage divider that lowers the battery supply voltage below the low voltage threshold in response to activation of the user-operable switch.

7. The battery isolation circuit of claim 1, wherein the user-operable switch includes a first switch and a second switch operatively connected to a combinational logic gate, and wherein the combinational logic gate is configured to activate the user-operable switch in response to the first switch and the second switch being activated at the same time.

8. The battery isolation circuit of claim 7, further comprising:
a timer circuit operatively intermediate the combinational logic gate and the drive diverter, the timer circuit including a resistor connected in series with a capacitor, and wherein the timer circuit is configured to apply an activation voltage to the drive diverter in response to the capacitor being charged through the resistor for a designated period by activation of the user-operable switch.

9. The battery isolation circuit of claim 8, further comprising:
a reset circuit including a diode operatively intermediate the combinational logic gate and the drive diverter and connected in parallel with the resistor of the timer circuit, wherein the diode is reverse biased causing the capacitor to be charged when the combinational logic gate is driving a high output in response to activation of the user-operable switch, and wherein the diode is forward biased causing the capacitor to be discharged to reset the battery isolation circuit after the battery has been disconnected from the load.

10. The battery isolation circuit of claim 1, further comprising:
a timer circuit operatively intermediate the user-operable switch and the drive diverter, the timer circuit being configured to apply an activation voltage to the drive diverter in response to the user-operable switch being activated for a designated period.

11. A battery isolation circuit comprising:
a power switch operatively intermediate a battery and a load;
a PCM operatively connected to the power switch, the PCM being configured to selectively drive the power switch to electrically connect the battery to the load;
a user-operable switch including a first switch and a second switch operatively connected to a combinational logic gate, the combinational logic gate being configured to activate the user-operable switch in response to the first switch and the second switch being activated at the same time; and
a drive diverter configured to interrupt the PCM from driving the power switch in order to electrically disconnect the battery from the load in response to activation of the user-operable switch.

12. The battery isolation circuit of claim 11, wherein the PCM selectively drives the power switch by supplying a drive current to the power switch, and the drive diverter is configured to interrupt the PCM by shunting the drive current provided by the PCM to a ground in response to activation of the user-operable switch.

13. The battery isolation circuit of claim 12, wherein the drive diverter includes a FET having a drain operatively connected between the PCM and the power switch, a gate operatively connected to the user-operable switch, and a source operatively connected to the ground, and wherein activation of the user-operable switch charges the gate of the FET causing the drive current to be shunted via the FET to the ground.

14. The battery isolation circuit of claim 13, further comprising:
a pull-down resistor operatively intermediate the PCM and the source of the FET, the pull-down resistor being configured to pull down a drive voltage from the PCM to the ground when the gate of the FET is charged.

15. The battery isolation circuit of claim 11, further comprising:
a timer circuit operatively intermediate the combinational logic gate and the drive diverter, the timer circuit including a resistor connected in series with a capacitor, and wherein the timer circuit is configured to apply an activation voltage to the drive diverter in response to the capacitor being charged through the resistor for a designated period by activation of the user-operable switch.

16. The battery isolation circuit of claim 15, further comprising:
a reset circuit including a diode operatively intermediate the combinational logic gate and the drive diverter and connected in parallel with the resistor of the timer circuit, wherein the diode is reverse biased causing the capacitor to be charged when the combinational logic gate is driving a high output in response to activation of the user-operable switch, and wherein the diode is forward biased causing the capacitor to be discharged to reset the battery isolation circuit after the battery has been disconnected from the load.

17. The battery isolation circuit of claim 11, wherein the PCM selectively drives the power switch by supplying a drive voltage to the power switch, wherein the PCM receives a battery supply voltage from a positive terminal of the battery, wherein the drive diverter is configured to interrupt the PCM by lowering the battery supply voltage below a low voltage threshold of the PCM in response to activation of the user-operable switch, and wherein the PCM is configured to stop supplying the drive voltage in response to the battery supply voltage being less than the low voltage threshold.

18. The battery isolation circuit of claim 17, wherein the drive diverter includes a first resistor operatively intermediate the PCM and the positive terminal of the battery and a second resistor connected in series with the first resistor, wherein the first resistor and the second resistor form a voltage divider that lowers the battery supply voltage below the low voltage threshold in response to activation of the user-operable switch.

19. A battery isolation circuit comprising:
a FET switch operatively intermediate a battery and a load;
a PCM operatively connected to the FET switch, the PCM being configured to selectively drive the FET switch to electrically connect the battery to the load by supplying a drive voltage to the FET switch, receive a battery supply voltage from a positive terminal of the battery, and in response to the battery supply voltage being less than a low voltage threshold, stop supplying the drive voltage to the FET switch; and a drive diverter including a first resistor operatively intermediate the PCM and a positive terminal of the battery, a second resistor connected in series with the first resistor, and a FET having a drain operatively connected to the second resistor, a gate operatively connected to a user-operable switch, and a source operatively connected to the ground, and wherein activation of the user-operable switch charges the gate of the FET causing the first resistor and the second resistor to form a voltage divider that lowers the battery supply voltage below the low voltage threshold to interrupt the PCM from driving the FET switch.

20. The battery isolation circuit of claim 19, wherein the user-operable switch includes a first switch and a second switch operatively connected to a combinational logic gate, and wherein the combinational logic gate is configured to activate the user-operable switch in response to the first switch and the second switch being activated at the same time.

* * * * *